United States Patent
Musman (10) Patent No.: US 7,127,441 B2
(45) Date of Patent: Oct. 24, 2006

(54) SYSTEM AND METHOD FOR USING AGENT-BASED DISTRIBUTED CASE-BASED REASONING TO MANAGE A COMPUTER NETWORK

(76) Inventor: Scott Abram Musman, 7800 Hayfield Rd., Alexandria, VA (US) 22315

(*) Notice: Subject to any disclaimer, the term of this patent is extended or adjusted under 35 U.S.C. 154(b) by 685 days.

(21) Appl. No.: 10/034,995

(22) Filed: Jan. 3, 2002

(65) Prior Publication Data

US 2003/0126501 A1    Jul. 3, 2003

(51) Int. Cl.
*G06F 17/00* (2006.01)
*G06N 5/00* (2006.01)

(52) U.S. Cl. ............................. 706/47; 706/12; 706/14
(58) Field of Classification Search ................. 706/47, 706/12, 14; 714/26
See application file for complete search history.

(56) References Cited

U.S. PATENT DOCUMENTS

| | | | |
|---|---|---|---|
| 5,504,837 A | 4/1996 | Griffeth et al. ............... 706/10 |
| 5,805,775 A | 9/1998 | Eberman et al. ............. 706/11 |
| 5,968,176 A | 10/1999 | Nessett et al. ............. 713/201 |
| 6,012,152 A * | 1/2000 | Douik et al. ................. 714/26 |
| 6,144,989 A | 11/2000 | Hodjat et al. ............... 709/202 |
| 6,212,528 B1 | 4/2001 | Brophy et al. ............. 707/103 |
| 6,226,273 B1 | 5/2001 | Busuioc et al. ............. 370/270 |
| 6,249,755 B1 * | 6/2001 | Yemini et al. ............. 702/183 |
| 6,260,059 B1 | 7/2001 | Ueno et al. ................. 709/202 |
| 6,421,719 B1 * | 7/2002 | Lewis et al. ................. 709/224 |
| 6,430,712 B1 * | 8/2002 | Lewis ......................... 714/47 |
| 6,493,697 B1 | 12/2002 | Stier et al. |
| 2002/0055903 A1 | 5/2002 | Solomon |
| 2002/0123983 A1 | 9/2002 | Riley et al. |
| 2002/0133721 A1 * | 9/2002 | Adjaoute .................... 713/201 |

* cited by examiner

*Primary Examiner*—Joseph P. Hirl
(74) *Attorney, Agent, or Firm*—Scott Chambris; Patton Boggs LLP; Martin Sulski (57) ABSTRACT

The present invention describes a system and method for using agent-based distributed case-based reasoning to manage a computer network. In particular, the system includes interface agents, distributed case-based reasoning agents, and response agents, which run on hosts in the network. An interface agent monitors a resource in the network and reports an event to an appropriate distributed case-based reasoning agent. The distributed case-based reasoning agent, using one or more case bases, determines a response to the event. An appropriate response agent implements the response.

36 Claims, 9 Drawing Sheets

| Display | Help |
|---|---|

Case Name: passwd file
Documentation: Someone taking password file
Platforms: All
Specific: 9
Priority: 10

Response
: Set-Flag $ local
• • • •

◉ Active   ○ Always Fire   ○ Call Next   ○ Timeout

Case Contents

| | | | |
|---|---|---|---|
| sysflag | SYSTEM - MONITERD REMOTE HOST | compare | not-sysflag ▶ |
| timestamp | | compare | none ▶ |
| TIME | | compare | none ▶ |
| REMOTE-HOST | | compare | none ▶ |
| FILE-SIZE | "/passwd" | compare | none ▶ |
| FILE | | compare | none ▶ |
| transfer_TYPE | . . . | . . . | . . . |

SYSTEM AND METHOD FOR USING AGENT-BASED DISTRIBUTED CASE-BASED REASONING TO MANAGE A COMPUTER NETWORK

BACKGROUND OF THE INVENTION

1. Field of the Invention

The present invention relates to a system and method for using agent-based distributed case-based reasoning ("CBR") to manage a computer network. In particular, the present invention relates to a system and method that use agents and distributed CBR to detect an event within a computer network, analyze it, and automatically respond to the event based on the analysis.

2. Discussion of the Related Art

Recent cyber-attacks on major corporate and government computer networks and World Wide Web ("WWW") sites continue to prove that the Internet can be a rough neighborhood. Today there are many tools and operating system-specific features ("OS features") to manage computer networks and secure computer networks from various types of cyber-attacks.

These tools, however, suffer from many shortcomings. Among these shortcomings, a lack of interoperability has limited effectiveness of a network management scheme based on these tools. Typically, to effectively manage and protect a network, a variety of tools and OS features need to be used together. However, because they are typically designed to operate independently of each other, they are neither interoperable nor capable of cooperating with each other. This lack of interoperability results in important system and security information being placed in numerous locations within a computer network, placing an undue burden on network administrators, who are forced to monitor a variety of data and reports. Further, the lack of interoperability increases a risk of overlooking important events. A detection of an event often requires synthesizing data from a variety of security tools. Since there is no effective tool to do such task, it falls upon network administrators, further increasing a burden on them and increasing a risk of overlooking events.

Other limitations of existing network management tools and OS features include: (1) they work from a centralized location within a network; and (2) they may not be compatible with one another. These limitations further increase a burden on network administrators by necessitating configuration of multiple machines within a network and by increasing an amount of data and reports that need to be analyzed to detect an event.

Given the above-stated shortcomings and limitations of existing network management and security tools, there has been an increased interest in developing a mechanism that links a variety of network management and security tools to event-response functions and that allows multiple tools to be used together in a coordinated fashion. In other words, there is a need for a system and method that ease network management tasks by allowing once disparate tools to communicate with one another and automatically provide an effective response to a variety of events, including internal and external security threats, through the use of artificial intelligence.

SUMMARY OF THE INVENTION

The present invention provides a system and method for using agent-based distributed case-based reasoning to manage a computer network. In particular, the present invention combines agent architecture and distributed case-based reasoning with available management or security tools to provide an automatic, adaptive response capability and distributed, decentralized, yet coordinated decision-making capability, to enable effective and efficient management of a computer network.

To achieve these and other advantages and in accordance with the purposes of the present invention, as embodied and broadly described herein, the invention includes an agent-based distributed reasoning system for managing a computer network. The system includes interface agents that run on hosts in the computer network. The interface agents are assigned to resources within the computer network. The system also includes distributed case-based reasoning agents and response agents, both of which run on the hosts. In the system, an interface agent sends an input regarding an event to an appropriate distributed case-based reasoning agent. The appropriate distributed case-based reasoning agent, upon receiving the input, accesses one or more case bases to select a response and sends the response to an appropriate response agent. The appropriate response agent implements the response to resolve the event.

In another aspect, the invention includes a method for managing a computer network. The computer network has agent-based architecture and agents. The agents include interface agents, distributed case-based reasoning agents, and response agents. The method includes monitoring a resource in the computer network using an interface agent and reporting, using the interface agent, an event in the resource to an appropriate distributed case-based reasoning agent. The method further includes selecting a response using the appropriate distributed case-based reasoning agent and implementing the response using an appropriate response agent. The appropriate distributed case-based reasoning agent accesses one or more case bases to select a response.

In yet another aspect, the invention includes a system for managing a computer network with agent-based architecture. The computer network has agents, including interface agents, distributed case-based reasoning agents, and response agents. The system includes means for monitoring a resource in the computer network using an interface agent and means for reporting, using the interface agent, an event in the resource to an appropriate distributed case-based reasoning agent. It also includes means for selecting a response using the appropriate distributed case-based reasoning agent by accessing one or more case bases and means for implementing the response using an appropriate response agent.

Finally, the invention includes a computer program product for managing a computer network. The computer network has agent-based architecture with agents including interface agents, distributed case-based reasoning agents, and response agents. The computer program product includes computer readable program code configured to: (1) monitor a resource in the computer network using an interface agent; (2) report, using the interface agent, an event in the resource to an appropriate distributed case-based reasoning agent; (3) select a response using the appropriate distributed case-based reasoning agent by accessing one or more case bases; and (4) implement the response using an appropriate response agent. It also includes a computer readable medium in which the computer readable program codes are embodied.

Additional features and advantages of the invention are set forth in the description, which follows, and in part are apparent from the description, or may be learned by practice of the invention. The objectives and other advantages of the invention are realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference is now made in detail to the preferred embodiment of the present invention, examples of which are illustrated in the accompanying drawings.

Figure 1:
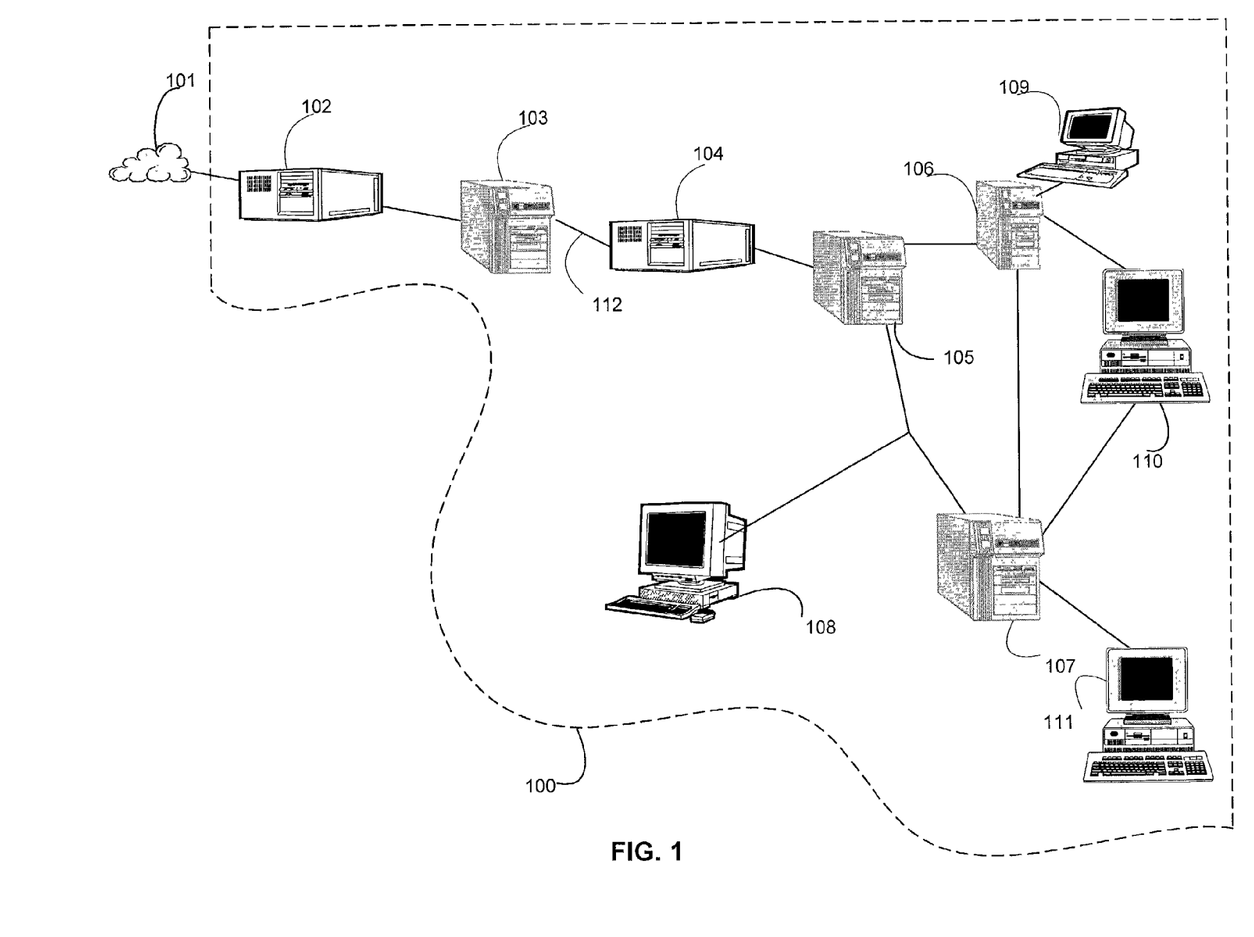
FIG. 1 is a block diagram depicting one example of a computer network, which may be managed by the present invention.

FIG. 1 depicts a computer network 100, which may be managed using the present invention. The computer network 100 is connected to the Internet 101. The computer network 100 includes routers (102 and 104), hosts (103, 105, 106, and 107), and desktop computers (108, 109, 110, and 111). A network 112 connects the routers, hosts, and desktop computers to each other. The hosts and desktop computers may run different operating systems, including UNIX, LINUX, and Microsoft Windows NT, for example. In other words, the present invention is operating system and network architecture independent and may be used to manage a wide variety of networks.

The computer network 100 may be managed by a variety of security tools, which may reside in one or more of the hosts. For example, the host 103 may have a firewall tool and the host 105 may include a web-filter tool. The host 107 may serve as an access server and rely on its security tools, including its operating system features. In sum, as described in detail below, the present invention may be used to accommodate a variety of network management and/or security tools, and to provide means that allows various tools to cooperate with each other.

The present invention may be built on top of an agent architecture. Agents are programmable entities that can exchange messages, change state, and perform actions. Each agent is a separate entity that is able to interact with and reason about its own environment.

Agents typically operate independently. They each have their own view of the environment, in which they operate. In other words, two identical agents with an identical piece of information may react differently simply because they may have previously received different information and have different views about the state of the environment.

The use of an agent architecture increases survivability of a network management system of the present invention. In agent architecture, a function of a failing or failed agent may be reassigned to another agent. As such, a failure of one agent would have little or no effect on functions performed by a network management system of the present invention.

Agents may carry out conversations with other agents or perform local actions within their environment. Agents may exist in a local or remote execution environment (or in an agent framework) whose purpose is to run agents by managing message passing and schedule agents for execution. A directory service may be used to make message transmission work the same among sites as within sites.

Agents, when used in a distributed computer network environment, allow abstraction and categorization of network-management-related information that is reported on different log files on multiple machines within the network in a variety of formats. One skilled in the art will appreciate that above-stated features of agents enable a distributed, decentralized, and yet coordinated decision making.

The present invention may be built on top of publicly available agent architecture, such as the Agent Building Shell ("ABS"), which is a Lisp-based agent tool, or Java Agent Template (lite) ("JATLite"), which is a Java-based tool developed by researchers at the Stanford University. It may use a common coordination language, such as Knowledge Query and Manipulation Language ("KQML"), Coordination Language ("COOL"), Knowledge Interchange Format ("KIF"), Common Intrusion Detection Framework ("CIDF"), Extensible Markup Language ("XML"), and/or Intrusion Detection Message Exchange Format ("IDMEF").

Agents in the present invention may have one or more of the following characteristics. First, agents may be implemented in a distributed manner, allowing workload and computation to be distributed among many processes and machines. This distributed implementation of agents reduces an overhead incurred by a single process and increases the fault tolerance of a system. Second, agents may be implemented to allow functional abstraction, which allows directives to be issued from a functional perspective rather than having to be explicit about the implementation details of each directive to be accomplished. Third, agents may be implemented to facilitate tool integration. In other words, within agent architecture, a series of separate tools may be integrated. A set of predefined messages can be defined for each tool, allowing them to be controlled either locally or remotely from a common interface. The tools can be operated together to fulfill some purpose larger than the capability of any one of the tools on its own.

Figure 2:
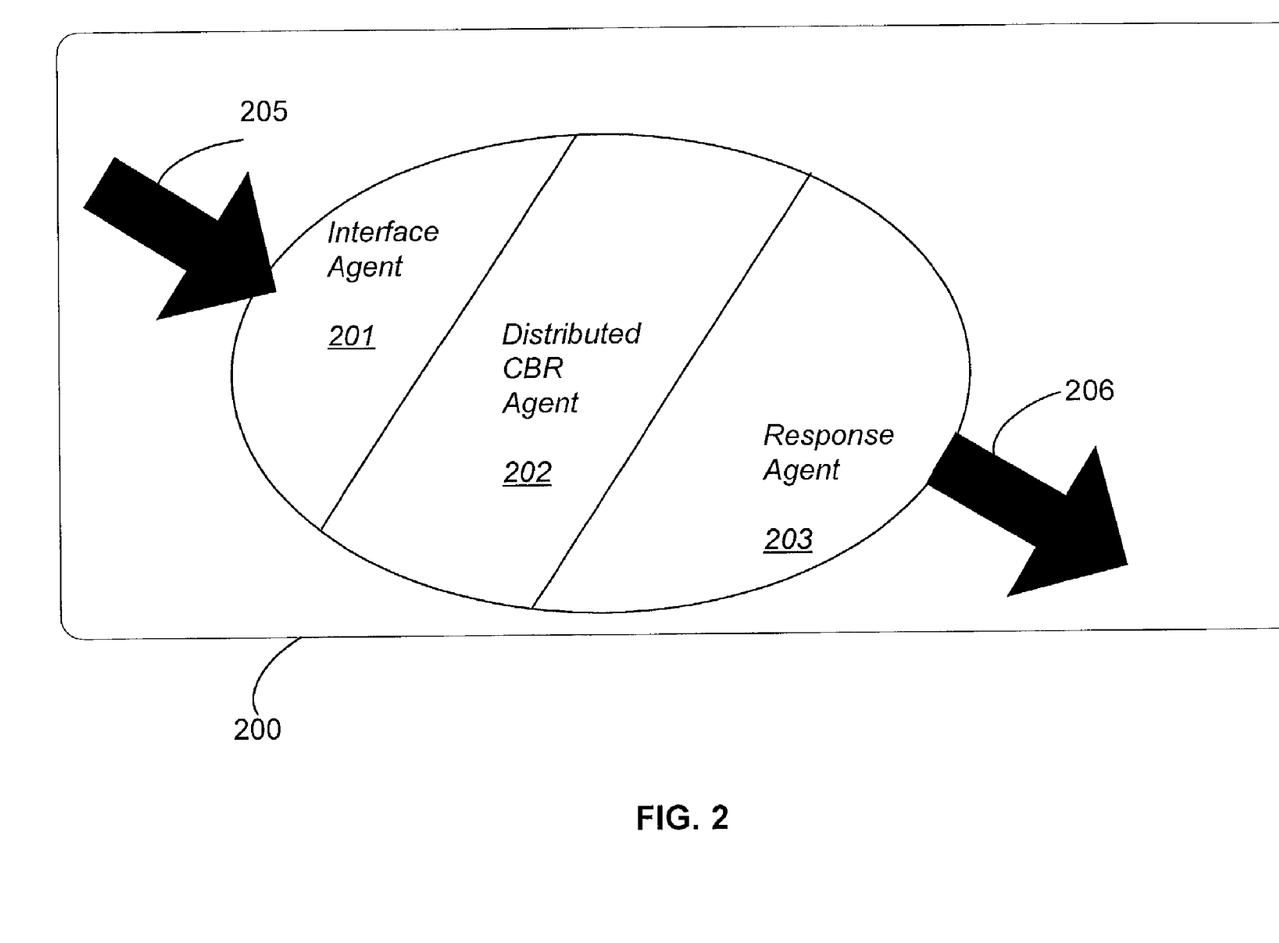
FIG. 2 is a block diagram showing one exemplary relationship between an interface agent, a distributed CBR agent, and a response agent of the present invention.

Agents used in the present invention may be categorized based on a responsibility assigned to them. For example, the present invention may include interface agents, distributed CBR agents, and response agents. FIG. 2 shows a logical view of one exemplary relationship among interface agents, distributed CBR agents, and response agents. As described below, in FIG. 2, an interface agent 201 gathers information to be processed by a distributed CBR agent 202, which then uses a response agent 203 to implement appropriate actions, if any.

The interface agent 201, distributed CBR agent 202, and response agent 203 run on a host 200 in a computer network that is managed by the present invention. The interface agent 201 processes information 205 received from an application, a security tool, or a machine, for which the interface agent 201 is responsible. The interface agent 201 sends an input to the distributed CBR agent 202 for processing. The input from the interface agent 201 typically contains pertinent information within information 205. The distributed CBR agent 202 then processes the input applying CBR, which is explained in detail below. In short, it finds one or more matching cases stored in a case base, and chooses an appropriate response from the matching cases and sends information regarding the response to the response agent 203. The response agent 203, in turn, issue a response directive 206, which contains specific instructions to be executed within the host 200.

The present invention may use other types of agents, example of which include input-filter agents, file-monitor agents, command-execution agents, command-file-execution agents, logging agents, email agents, and alert agents. Input-filter agents may monitor log files and routinely scheduled commands. File-monitor agents may monitor a specific file and generate a case message using a regular expression from the log-file event contents. Command-execution agents may periodically execute a command and parse an output of the command into one or more case message entries. Command-file-execution agents may periodically execute a command that produces an output file and parse the output file contents into one or more case message entries. Logging agents may append the message contents of a received message to a file specified at a configuration time. Email agents, given a list of recipients, a message template file, and some arguments, may substitute the arguments into a message template and send a message to the recipients. Finally, alert agents, upon receiving a message, popup a window on a screen displaying the contents of a message.

In addition, the present invention may include a distributed CBR monitor agent, which may allow viewing of CBR case bases, cases, flags, and host log, and a status agent, which may monitor case matching activity over multiple hosts within a network. One skilled in the art will appreciate that the present invention allows many different types of agents besides those described above and is not limited by types of agents used.

Agents used in the present invention may collaborate with each other. One example of collaboration is now described.

A distributed agent function may be implemented as a set of agents that can track a user who is logged in to many machines within a single network. For instance, a user may use telnet or rlogin to log in to multiple machines. Tables 1 and 2 contain COOL code fragments for such agents. Specifically, Table 1 shows a definition of a conversation-class user-source-location used by agents and Table 2 shows a conversation-rule for cl-5 to check log-in status to move from "logged-in" to "local."

TABLE 1

(def-conversion-class 'user-source-location
 :name 'user-source-location
 :content-language 'list
 :speech-act-language 'kqml
 :initial-state 'start
 :final-states '(spoofed not-logged-in tty finger remote-query)
 :control 'interactive-choice-control-ka
 :rules '((start cl-1) (valid? cl-3 cl-2)
   (logged-in cl-6 cl-5 cl-4) (local? cc-8 cl-7)
   (enclave cc-10 cl-9)))

TABLE 2

(def-conversation-rule 'cl-5
 :current-state 'logged-in
 :received '(is-logged-in :sender ?s :content ?c)
 :next-state 'local?
 :incomplete nil)

These agent functions may be installed on every machine in a network. When queried, they determine whether or not a login is valid and/or local, and invokes the assistance of agents on remote machines when necessary. This allows the agents to track the source of a login irrespectively of whether or not operating systems of machines are the same. On reaching the boundary of agent-enabled systems, an agent may perform more standard queries to the remote system, such as finger, that may provide information about the origin of a login.

Conversations or messages may cause an agent to move from one state to another within a state diagram. When using the agent language COOL, for example, agent messages may be viewed as a state diagram and analyzed as a petri net. The example describes the implementation of this functionality using ABS and the agent language COOL.

Similarly, agent conversations may be programmed in KQML using JATLite, for example. One skilled in the art would recognize that the functionality of the JATLite implementation is the same as above, but the syntax of the program is different because JATLite uses KQML and Java, whereas ABS and COOL are implemented in Lisp.

Figure 4:
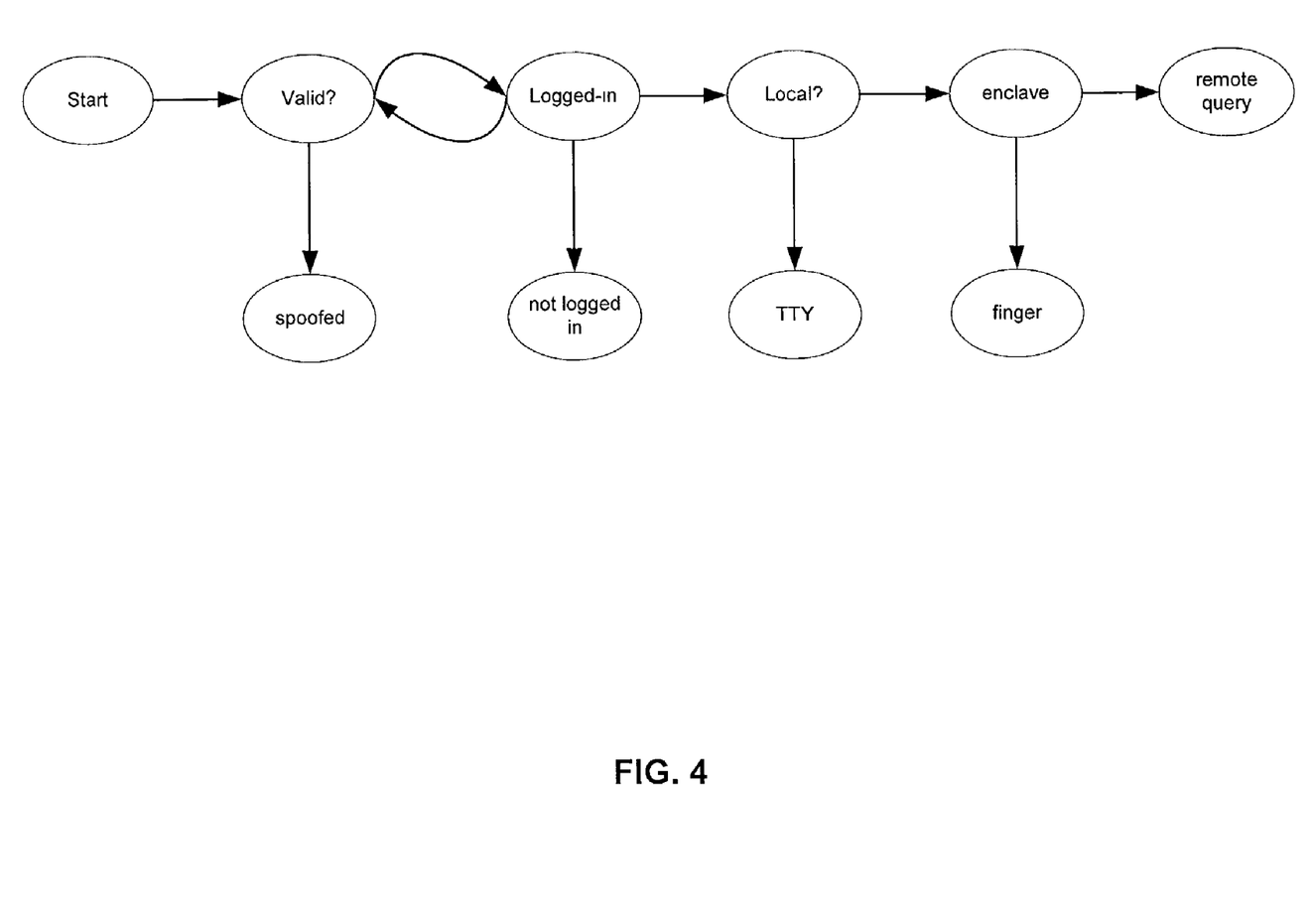
FIG. 4 is a block diagram showing one exemplary state transition of an agent in the context of a user-source-location conversation.

A state transition diagram in FIG. 4 shows one exemplary state transition of an agent in the context of a user-source-location conversation. Specifically, it describes one exemplary state transition of an agent that is invoked to determine if a user is logged into a machine by describing agent's function in terms of primitive operations.

In FIG. 4, an agent first validates a user name. If it is invalid, it may return that the system may have been spoofed. If valid, it then confirms that the user is logged-in. If the user is logged-in, it determines if the login is from a local tty or from a network. The agent may repeat this operation as many times as necessary if the user is actually originated as someone else on the machine by using, for example, su username. If the login is local, the agent returns the local tty. If the login is remote, the agent determines if the remote machine is part of a protected enclave. If the remote machine is part of the protected enclave, an agent on the remote machine that performs a similar function is invoked. If the remote machine is not in the protected enclave, information-gathering procedures are invoked to gather information about the remote machine and the user.

Figure 3:
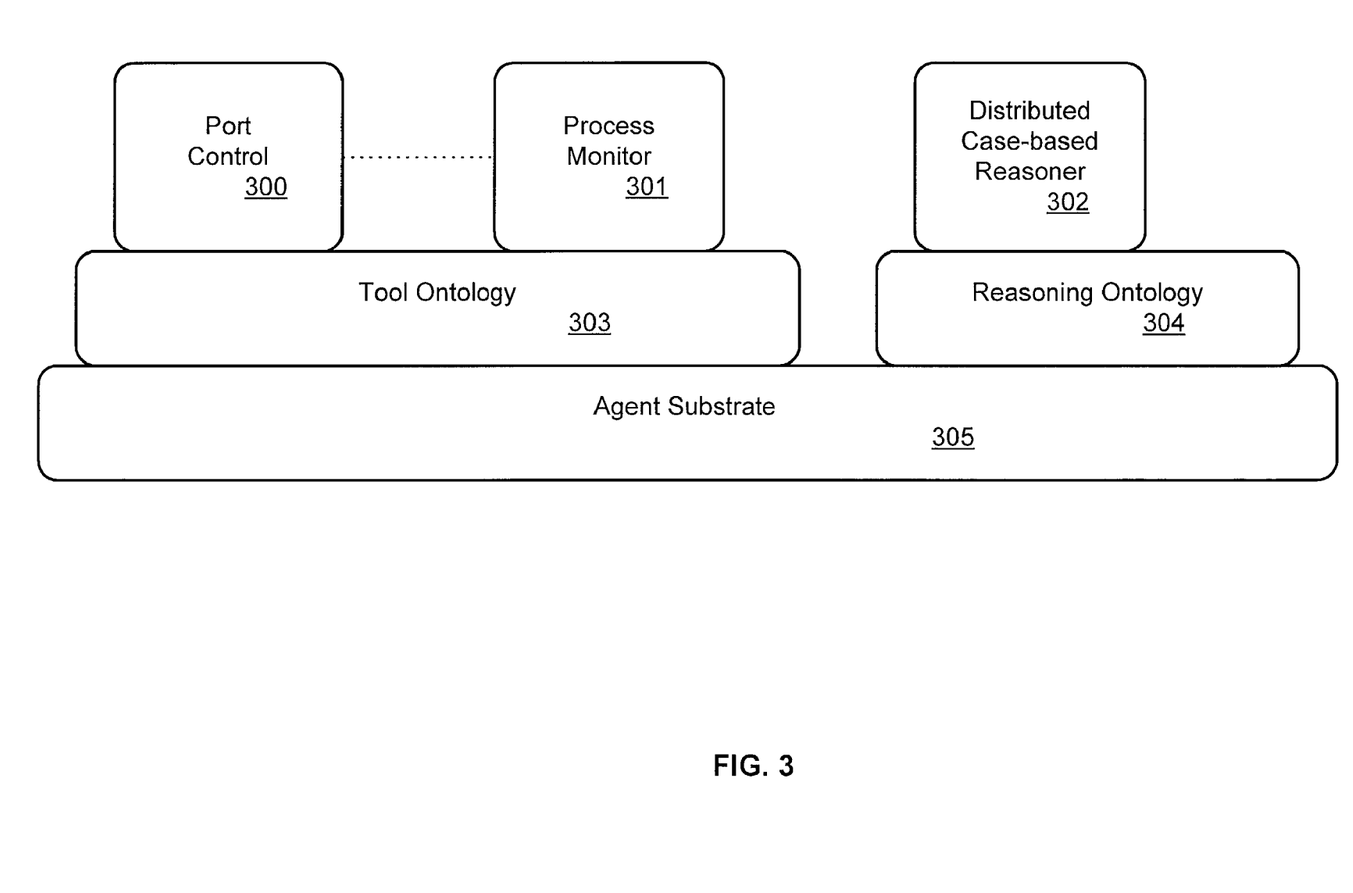
FIG. 3 is a representational diagram showing an exemplary layered topology of the present invention.

The present invention may be extended to support various tools and reasoning capabilities allowing an end-user to extend and build upon existing facilities. Specifically, the present invention may feature a layered topology such as one shown in FIG. 3. In FIG. 3, a tool ontology layer 303 and a reasoning ontology layer 304 reside on top of an agent substrate 305. For the tool ontology layer 303, one may have various tool-related layers such as a port control 300 and a process monitor 301. On top of the reasoning ontology layer 304, one may have a distributed case-based reasoner 302. Other reasoning capabilities may include Bayesian networks and a rule-based expert system, for example.

Figure 8:
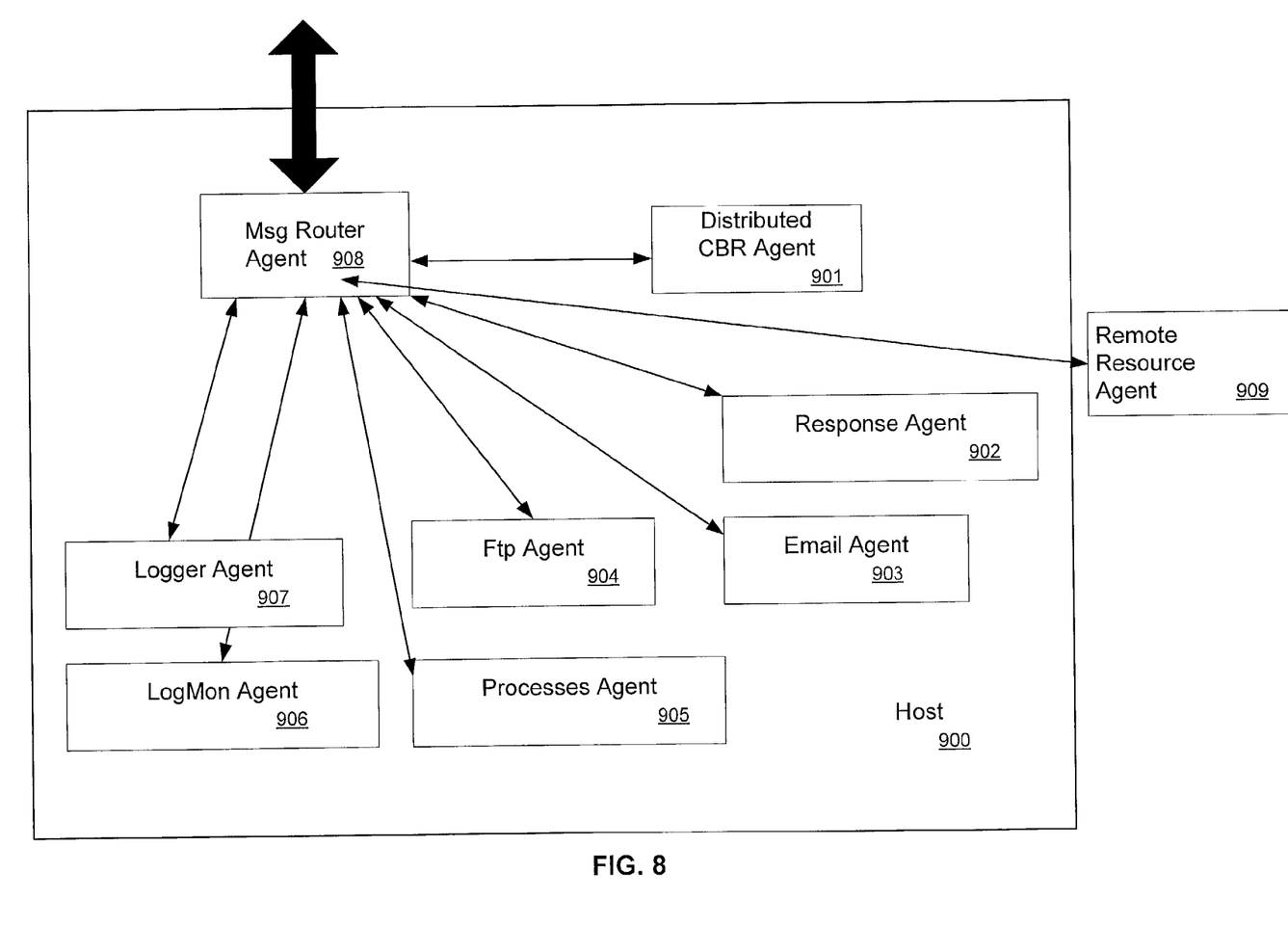
FIG. 8 is a simplified representational diagram showing one use of the present invention in a single-host environment.
Figure 9:
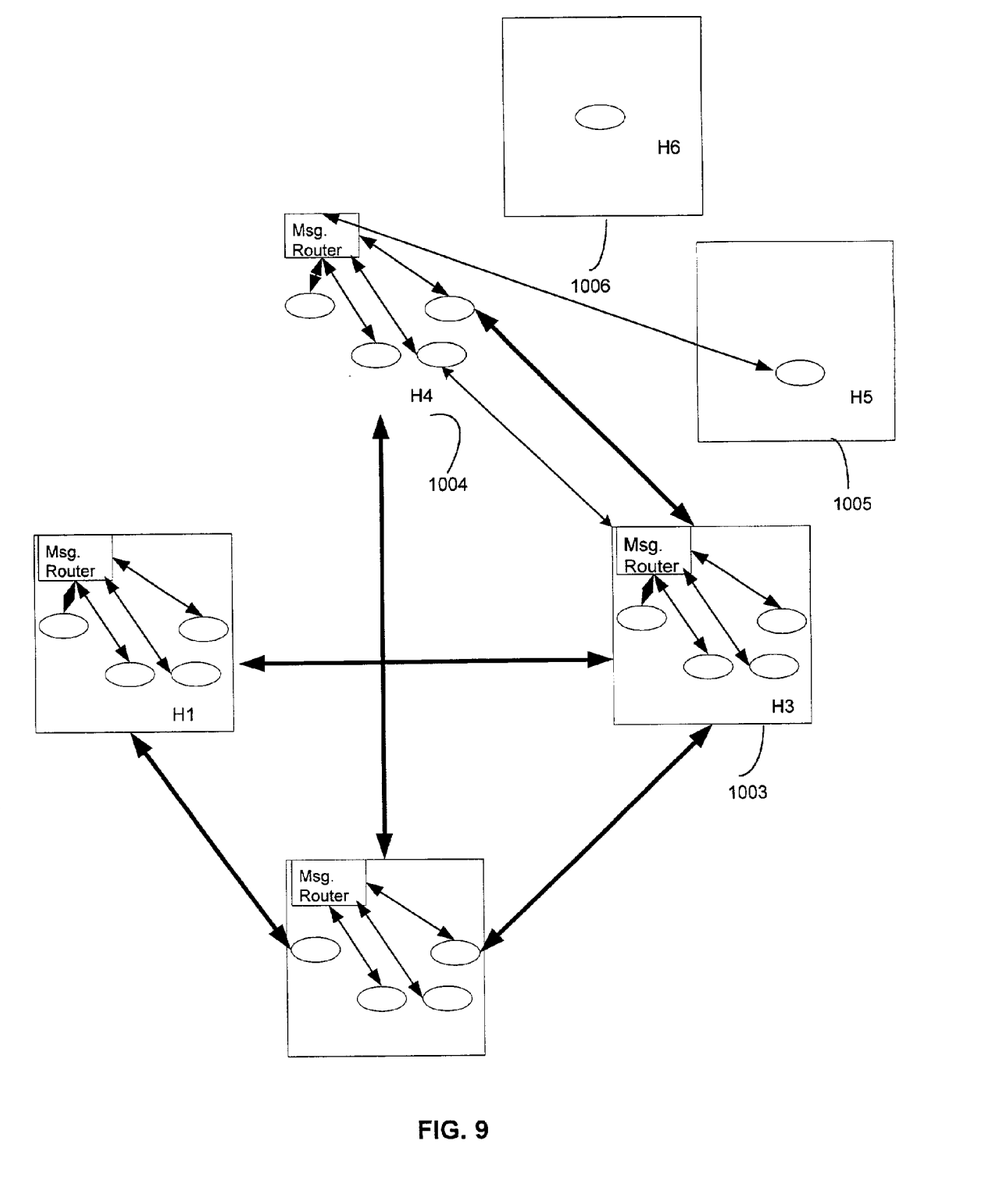
FIG. 9 is a simplified representational diagram showing one use of the present invention in a multiple-host environment.

FIGS. 8 and 9 describe how agent architecture of the present invention may be used in single host and multiple host environments, respectively. Turning first to FIG. 8, agent architecture is implemented in a single host 900. The host 900 contains various types of agents, including, for example, a distributed CBR agent 901, response agent 902, email agent 903, ftp agent 904, processes agent 905, logmon agent 906, which monitors a log, logger agent 907, and message router agent 908.

In this example, the message router agent 908 is used to assist communication among agents, including the other agents in the host 900, a remote resource agent 909, and agents in other hosts connected to the host 900 via a network. Alternatively, agents may communicate directly with each other without using an intermediary agent such as the message router agent 908 or use other mechanisms such as a host-manager or facilitator.

In FIG. 9, agent architecture is used with multiple hosts that are connected to each other via a network. Specifically, hosts H1 (1001), H2 (1002), H3 (1003), and H4(1004), which are connected to each other via a network, each has the agent architecture installed. Further the hosts H1 (1001), H2 (1002), H3 (1003), and H4 (1004) each has a message router, such as a JATLite message router to facilitate communication among local and remote agents, including remote agents on remote hosts H5 (1005) and H6 (1006). Those skilled in the art would know that the agent architecture of the present invention may be implemented using various agent frameworks. In other words, they would recognize that the present invention is not limited by a specific agent framework.

Next, interface agents, response agents, and distributed CBR agents of the present invention are described in more detail.

Interface Agents:

As discussed above, an interface agent may be used to monitor an output of a system or security monitoring function and to pass information from it onto a distributed CBR agent in the form of a pre-negotiated case structure. For example, an interface agent may be used to: (1) monitor and parse entries in a log file created by a system and/or add-on tool; (2) execute and parse the output of commands that can be invoked via a command-line terminal; (3) monitor and parse files produced as a result of executing a command from a command-line terminal; and/or (4) use an extensible API to allow programmers to integrate tools that do not fit the command line or log file model.

An interface agent may be used to monitor a variety of resources in a computer network. Examples of such resources include network management tools, network security tools, operating system specific features, and health tools such as a disk defragmenter.

By describing outputs from various systems and security monitoring functions using a pre-defined set of messages, the interface agents make it possible to integrate them within the present invention. In integrating a system and function, one may use ready-made (or pre-defined) interface agents or may choose to develop a custom interface agent for any given security or management tool or function so that it can interact with the present invention using pre-defined messages.

In integrating various security and management tools, the present invention may utilize common characteristics of such tools. For example, most security and management tools operate via command-line interfaces, produce output alerts that are put in log files, and/or contain some sort of structured outputs that can be redirected from stdout to a file. Pre-defined interface agents may be designed to monitor such log files, parse new entries, and pass them to a distributed CBR agent. Alternatively, they may be designed to invoke programs at a shell command line, parse their output, and pass elements to a distributed CBR agent.

In implementing parsing, the present invention may take advantage of the fact that most system logs and program outputs are well structured. As an example, Table 3 illustrates one embodiment of parsing using a log entry on an SGI machine. For example, a typical SGI log entry, "stommel November 17 13:03 15:00 imsidc.com emacs: (:0.0)" may have a tool interface agent definition shown in Table 3.

TABLE 3

File: /var/log/messages
Platforms: Linux
ParseString:
\w+\s+\d+\s+\d+:\d+:\d+\s([\w.]+)\s([\w\s.]+)\\[?(\d*)\]?\:?[\s]+(.+)
SplitString: [:\s'|@:=\(\)\[\]]+
Fields: Host, Process, PID, Description
OutputOrder: 1, 3, 2, 4

The example in Table 3 parses the line into entries for Host, Process, PID, Description, etc. It then reorders the contents into a case structure message for processing by a distributed CBR agent. In this example, the tty entry is placed ahead of the program entry. Those of ordinary skill in the art will appreciate that there are a variety of parsing format extensions that can be used to extract common date, time, and other items in log files. They will also appreciate that similar entries can be made for other machine variants to account for any format differences.

Figure 5:
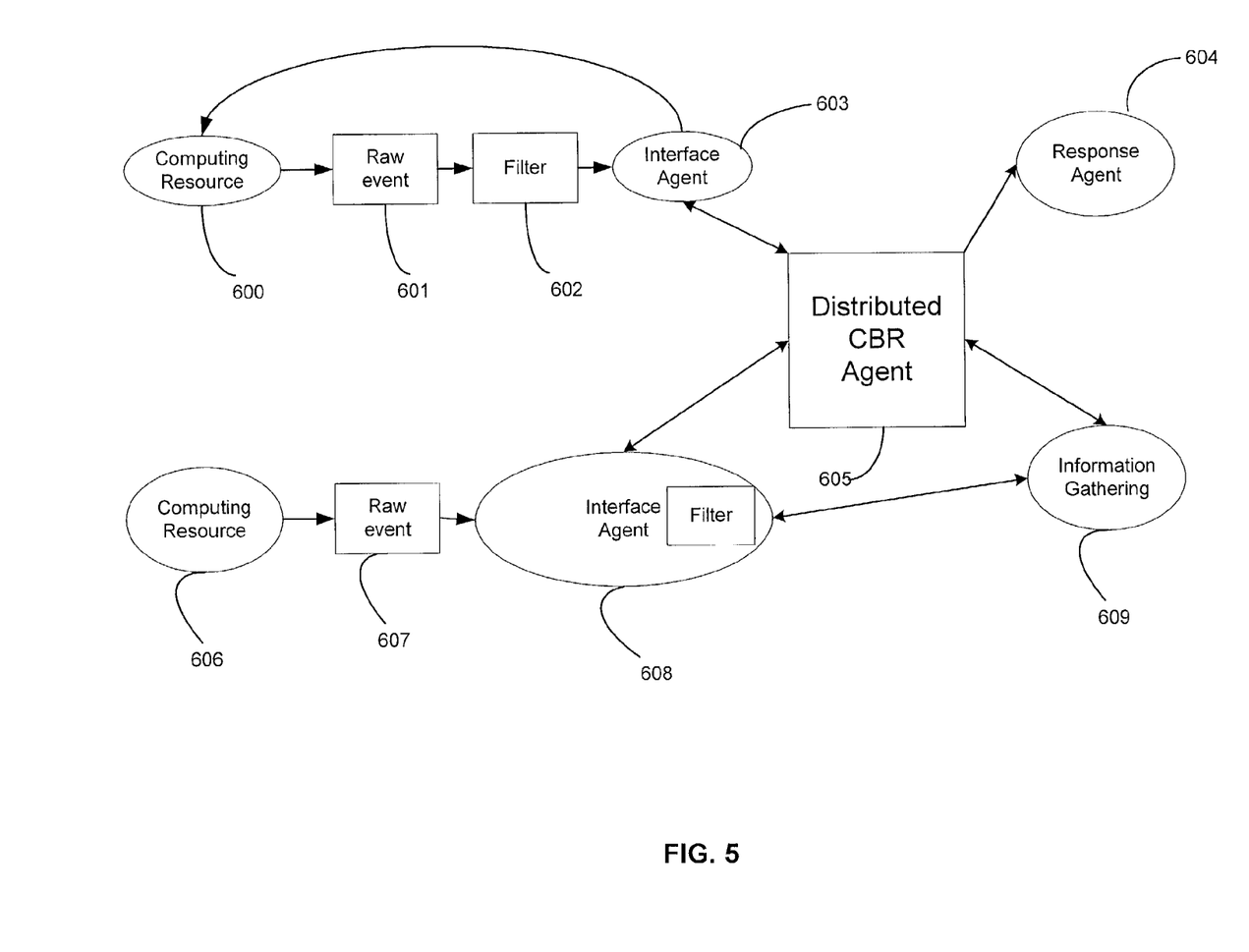
FIG. 5 is a block diagram showing one exemplary interaction among interface agents, a distributed CBR, and a response agent of the present invention.

FIG. 5 is a logical block diagram showing one example in which interface agents are used to integrate a multiple tools and resources. In FIG. 5, a computing resource 600 produces an output describing a raw event 601, which is then processed by a filter 602. An interface agent 603, upon receiving information from the filter 602, forwards it to a distributed CBR agent 605 for processing. The interface agent 603 also sends information to the computing resource 600.

The distributed CBR agent 605 also receives information regarding a computing resource 606 from an interface agent 608. Like the computing resource 600, the computing resource 606 produces raw event data 607. The interface agent 608 has a filtering capability within it to prepare the raw event data 607 for processing by the distributed CBR agent 605. The interface agent 608 exchanges information with the distributed CBR agent 605 and communicates directly with an information-gathering agent 609.

The distributed CBR agent 605, upon receiving information from one or more interface agents connected to it, process the information and sends a result to a response agent 604, when appropriate. It also communicates directly with the information-gathering agent 609.

Response Agents

As discussed above, a response agent may be used to implement a response directive issued by a distributed CBR agent. Appendix I lists exemplary primitive response functions that may be performed by a response agent. Those skilled in the art would know that a response agent of the present invention is not limited by response functions that it performs—a response agent may perform some of the functions listed in Appendix I, different functions, and/or additional functions.

Response agents may collaborate or coordinate primitive response functions. Response agents may enlist other agents when necessary and propagate situation information to other systems or devices. For example, a response agent may trace a suspicious user back to his origin in an Intranet and disable a specific network service that was exploited by reconfiguring TCP wrappers locally on a machine, reconfiguring a firewall, or reconfiguring an agent enabled router, for example.

Response agents may check appropriate system status information to confirm that all necessary preconditions have been met and there are no conflicts present that might make an action invalid and/or that might conflict with some other activities of the system.

Distributed CBR Agents

A distributed CBR agent of the present invention uses case-based reasoning or CBR to find an appropriate response to an event reported by an interface agent. In CBR, a problem is compared to prior cases in a case base in order to draw conclusions about the problem and to guide making decisions. In CBR, each case in a case base is paired with an associated response. When a case in the case base matches a current problem, an associated response stored in the matching case is implemented. A matching case is determined by comparing values in the case structure of a case to be matched and corresponding values for the current problem. Typically, a matching case is a case whose values are closest to those of the current problem. The case base may include rules to resolve multiple matches so that one response can be selected for the problem.

In the present invention, CBR is used to find an appropriate response in real-time based on information regarding similar situations that occurred in the past. Specifically, upon encountering an event, CBR may be used to match the current event to similar past events stored as cases in a case base. Preferably, these cases represent previously encountered situations in which a successful response was implemented. Using information contained in cases for similar past events, CBR arrives at an appropriate response for the current event. Such response may be to implement a response associated with the closest past event or to adapt one or more past responses to the current event by using arguments from the current event and/or current system state.

Figure 7:
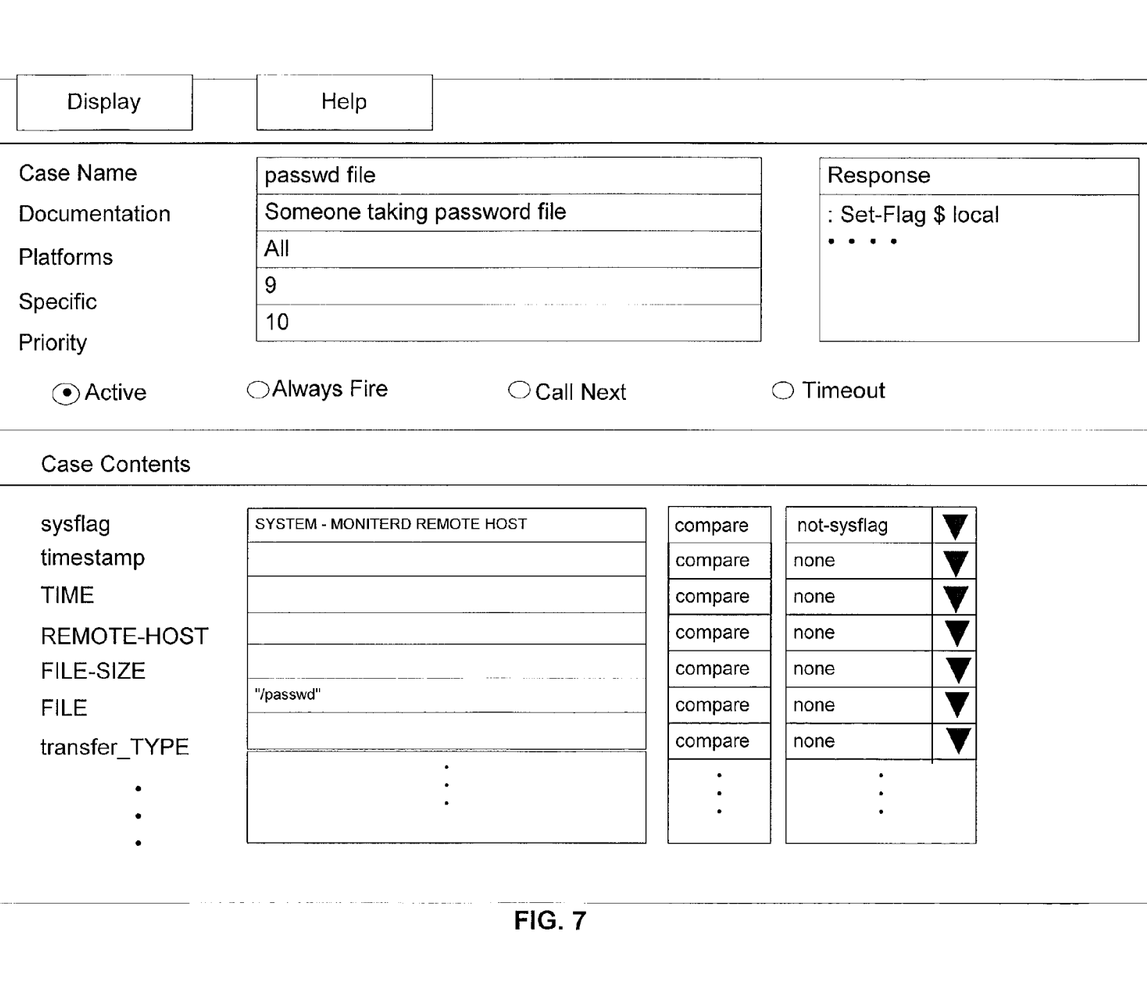
FIG. 7 is a diagram showing one exemplary case structure that may be used in the present invention.

A case base contains cases, which represent known situations that may require response. A case structure of a case represents all the relevant variables associated with making a decision for a particular problem. FIG. 7 shows one exemplary case structure, which uses entries found in a SYSLOG file to detect an event in which someone other than the root tries to use a UNIX "su" command during a certain time period (in this case, in the EVENING).

The present invention may use one or more case bases. For example, a case base may be defined for a tool or a group of tools that share similar characteristics, such as the same operating system and/or security policy. One case base may be used by one or more tools in the group, but for those tools with different characteristics, a different case base may be used.

Figure 6:
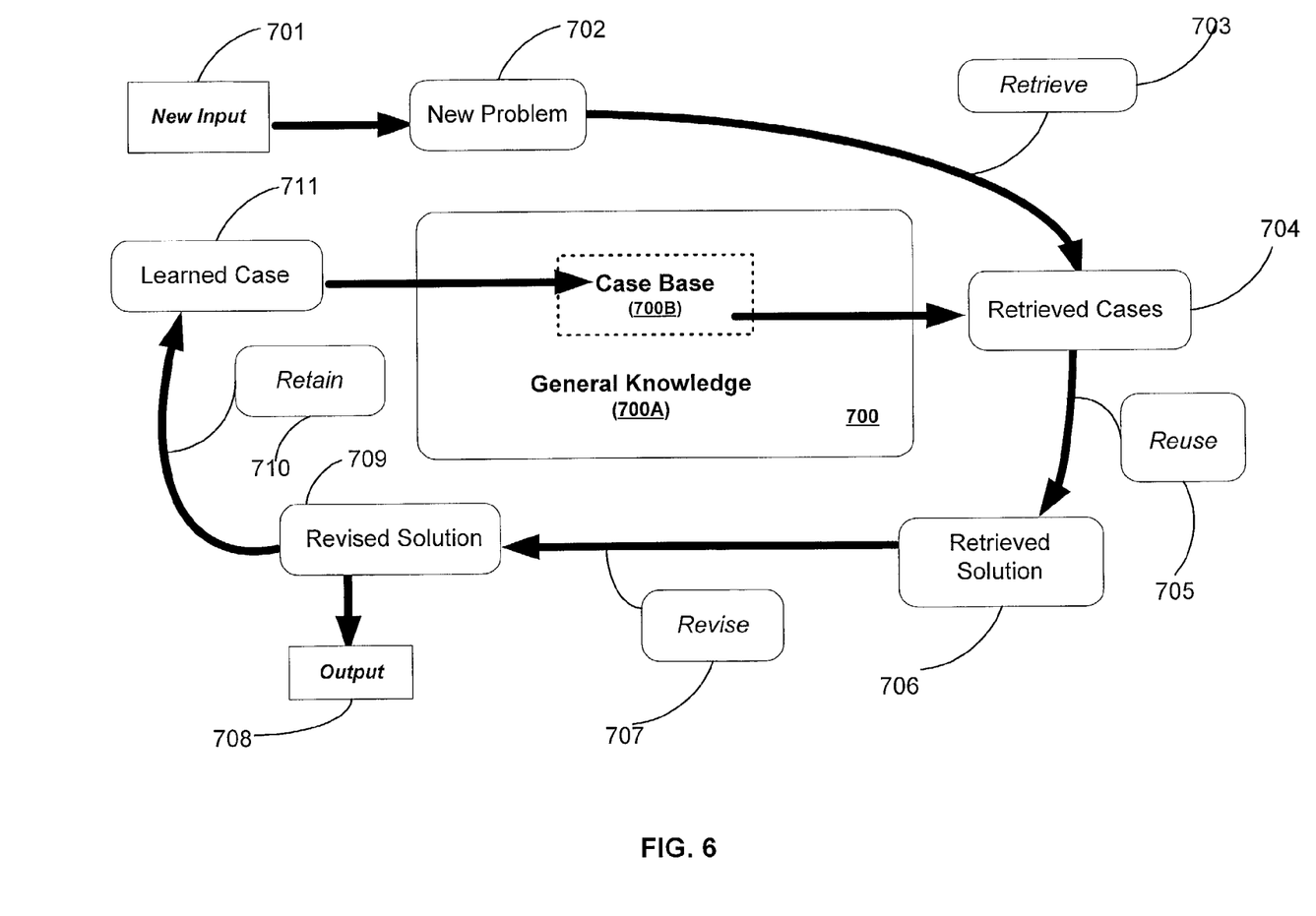
FIG. 6 is a block diagram illustrating one case-based reasoning scenario of a distributed CBR agent of the present invention.

FIG. 6 illustrates one basic flow of a CBR system of the present invention. In FIG. 6, a CBR system accesses a knowledge base 700, which contains a case base 700B and general knowledge 700A. The knowledge base 700 is used to draw conclusions about a new problem 702. Specifically, the new problem 702 is defined based on a new input 701. The CBR system then accesses the knowledge base 700 to retrieve (703) cases. Retrieved cases 704 are compared with the new problem 702. A matching case may be chosen from the retrieved cases 704. A retrieved solution 706 typically is the solution associated with a matching case and is reused (705) to arrive at a solution for the new problem 702. The retrieved solution 706 may be revised (707) to arrive at a revised solution 709. The revised solution 709 then becomes an output 708 of the CBR system. Further, the revised solution 709 may be retained (710) as a learned case (711) and stored in the case base 700B.

Several characteristics of a problem domain for the present invention make the use of CBR suitable. These characteristics include recurrence of problems, reusability of a solution for a particular problem, and the fact that a problem may be described in a structured matter.

In the present invention, a traditional CBR system is modified to make it even more suitable to network management and/or security tasks. Such modifications are now described in detail.

A CBR system of the present invention may differ from an existing CBR system in a sense that its CBR matching process is pushed to a much lower level. Specifically, in the present invention, a CBR matching process may be assigned to each monitored resource—for example, one distributed CBR agent of the present invention may match entries in system log files, one may match user account activity, and another different distributed CBR agent may match network access. In other words, the present invention uses multiple CBR agents and such CBR agents may be distributed throughout the network. An existing CBR system, on the other hand, typically uses a single CBR to monitor multiple hosts and resources.

In the present invention, distributed CBR agents may run on every host in a network. By distributing CBR agents throughout a network, the present invention enables local decision-making based on local resources. Distributed CBR agents may also be assigned to one or more resources in the network. They may monitor information from a single system resource or information that summarizes multiple resources. When outputs from several resources are fed to a distributed CBR agent, it enables the distributed CBR agent to identify an event pattern that may only be identifiable by combining outputs from several resources.

Distributed CBR agents of the present invention may share knowledge at different levels. Distributed CBR agents may share knowledge by sharing case bases. Alternatively, they may share knowledge through flags, which contain values, counts, and/or properties associated with a case. Flags in the CBR provide a way for one or more CBR to represent and share knowledge, even across case-bases. For example, flags in a case-base may be made visible to all distributed CBR agents.

When using CBR in the present invention, one may choose to designate a centralized decision node. If such nodes are designated, local functions may be used to deal with a decision node failure. For example, local functions may take over the operation of a centralized decision node until it comes back up, until the system is dynamically reconfigured, or until another node is designated to take place of the failed decision node.

A case base of a present invention may be defined to take advantage of the structured format of system information, such as system log files, command output, and management information bases. A case base may be defined for each resource monitored.

The present invention allows a user to modify various aspects of a CBR process. For example, a user may modify a case base by adding new cases. In so doing, a user may use case adaptation functions, such as those listed in Appendix I. A user may use this feature to represent some event of interest that requires a response. In other words, the features allows a user to dynamically add a new case matching functions specific to the event or modify an existing case by specifying appropriate case variables and policies to represent the event. Further, a user may implement new policies for existing cases using ranking and flags, for example. To deal with a situation where multiple cases match a current problem, a user may be allowed to specify a rank order of the matching cases or use a case switch to determine whether responses from some, one, or all of the matching cases are to be used. A user may use flags, which may contain values or counts, to chain between related events.

One preferred embodiment of the present invention supports case templates, which can be used by a user to dynamically add new cases and/or represent a specific situation. Case templates may exist for only a specific period of time. As described below, a user may use case templates to manage distributed CBR of the present invention.

Case templates may be used to represent situations that may be important some time in the future. For example, to deal with a likely situation where a computing system is repeatedly scanned from a specific remote location in the evening, a case template may be created to represent such situations and associate the situation with a response. When such a situation actually arises, the case template may be modified to better describe the actual situation. For example, the name of a suspicious host, once identified, can be added to the case template.

A user may also use case-templates to dynamically add new cases to a case base. This allows CBR matching process of the present invention to evolve in a way that performs extra work, such as turn on additional auditing, for example, directed only at specific problems, rather than having to direct extra work across every resource.

Case templates may also be used to analyze historical events or to look for future events. Many network activities involve some sequence of events, but an event is not always detected at the beginning of a sequence. Once a suspicious event has been detected, case templates may be used to review historical data stored in log files to find a larger pattern. By analyzing historical data, one is more likely to obtain vital information about the nature of the detected event. By allowing log files to be replayed through the current instantiation of matching functions in CBR, one may be able to detect events that were originally missed. It also allows the collection of all information relevant to some specific event to be presented as a single journal.

There are numerous scenarios in which more than one case in the CBR system may match a problem. This can occur deliberately or accidentally When this occurs there needs to be a mechanism that determines what a response should be—should the response for one of the matching cases be invoked, should some of the responses for the matching cases be invoked, or should all of them be invoked? The present invention allows a user to flexibly configure a response when multiple cases match a scenario.

For example, multiple cases may match a problem of pilfering and/or accessing an /etc/passwd file. This problem may match a generic case that represents any unauthorized access to any file in the /etc directory. This generic case may invoke a particular type of response, such as increasing monitoring of user activities related to accessing files in the /etc directory. The problem may also match a case that specifically represents pilfering and/or accessing of an /etc/passwd file that contains information regarding user accounts. This case may contain a more specific response than the generic case—such as checking the /etc/passwd file to see whether any new accounts are added or whether the file contains weak passwords that can be easily guessed. Using the present invention, the user may configure to implement responses of both cases or implement a response of one of the two cases.

Using a method invocation feature similar to those found in object oriented languages, a user may explicitly control what responses are implemented when there are multiple matching cases. Using this feature, a user may specify a precedence order of different cases, and then state whether an associated response should supersede responses with less precedence. Alternatively, a user may choose to invoke other responses with less precedence or choose a particular response irrespective of the precedence values of other responses.

Cases may be defined to have specificity and priority values. These values may be used to define a precedence order among multiple matching cases. For example, matching cases may first be ordered by their specificity values and then by priority values. The case structure of FIG. 7 has fields for both specificity and priority values.

Other conflict resolution mechanisms include response function call-switches. Such call-switches may indicate, for example, whether a case is active, always fired, or subject to time-out as shown in FIG. 7. In addition, a switch may indicate that a case is to fire a next case, as indicated in the call-next switch in FIG. 7. An active switch allows a user to turn a case on or off. When an always-fire switch is marked, a corresponding response is implemented irrespective of a precedence value assigned to the case. A time-out switch may be used to define a time period during which a case remains active. For example, when a template is instantiated, a time-out switch may be used to keep a case associated with the template only for a certain period of time. Finally, a call-next switch may be used to layer responses to an event. For example, if the call-next switch of a case with the highest precedence value is on, a next case, i.e., the case with the second highest precedence value, is fired after that case. A case with the third highest precedence value is fired, if the call-next switch of the case with the second highest precedence value is on. In sum, using a precedence-order, call-switch, or both, a user may flexibly select one or more responses to an event.

As discussed above, each case is associated with some response. Examples of a response include invoking agents that perform one or more direct actions using arguments from the current situation and invoking case-based adaptation commands such as those listed in Appendix I. By invoking case adaptation commands, one may dynamically add new case matching functions that are specific to the current problem to the CBR system.

Knowledge objects, cases, and templates of the present invention may be flexibly modified. Specifically, the CBR knowledge objects, cases, and templates may be modified locally within a single CBR, remotely to another CBR, or across a group of CBRs.

One skilled in the art will appreciate that by properly utilizing one or more features of the present invention, one can implement a variety of system alert levels that can dynamically alter the way a system responds to events. These features include a precedence order, case templates, and a feature that allows one to dynamically activate and deactivate cases already in a case base.

It will be apparent to those skilled in the art that various modifications and variations can be made in the present invention without departing from the spirit or scope of the invention. Thus, it is intended that the present invention covers the modifications and variations of this invention provided that they come within the scope of any claims and their equivalents.

APPENDIX I

| Response Mechanism | Description |
| --- | --- |
| EXAMPLES OF PRIMITIVE RESPONSE FUNCTIONS | |
| :exec | Executes a shell command or script with the appropriate arguments filled in. |
| :mail | Mails a mail template using substituted arguments in the mail template file to the appropriate user or Administrator. |
| :notify | Sends an on-line notification of the message template with the arguments substituted for the appropriate user or Administrator. |
| :append-log | Using a format string as an argument we can make entries in the specified system log file. The log entry can possibly cause another case to fire. |
| :kill-process | This will kill or stop the specified process. |
| :disable-host | Blocks all traffic and access from a specified system that is passed as an argument. This may or may not involve controlling a router or firewall via the agent. |
| :disable-service | Stops or turns off a specific network service from a specific host, user, or network domain. Examples of network services include http, mail, ftp, etc. |
| :disable-account | Allows disabling of a specified user or all user accounts. It is possible to permanently disable the account (e.g., requiring manual intervention to reinstate it) or a temporary measure that can be automatically reinstated. |
| :enable-account | Allows an account that has been temporarily disabled to be reinstated or reactivated. |
| EXAMPLES OF CBR KNOWLEDGE SHARING RESPONSE FUNCTIONS | |
| :set-sysflag | Sets a flag in the CBR agent(s) of the appropriate name along with a data value obtained from the current situation. A flag can either be set locally, or across a group of collaborating CBR agents. Optional arguments can assign a timeout to the flag. The flag will either disappear at a specified time, or after certain duration of time. |
| :unset-sysflag | Unsets the named flag and makes it disappear |
| :set-property | Allows the flag to also represent properties of key, value pairings. Flags and flag-properties can be used to represent information that can be shared between multiple resources and multiple CBR agents. |
| :unset-property | Removes the property from the flag data structure |
| :increment-flag | Uses a count field associated with the flag to keep track of arbitrary counts or frequencies of events. An Optional argument can automatically decrement the flag count after a certain amount of time. |
| :decrement-flag | Decrements the flag-count either locally, or across multiple CBR agents |
| EXAMPLES OF KNOWLEDGE SHARING RESPONSE FUNCTIONS | |
| :activate-cb | Activates the agents that monitor the resource associated with the case base (e.g., turns on a log file monitor). |
| :deactivate-cb | Disables the agent that monitors the resource associated with the case base. Because the agent is disabled, no additional events associated with that resource is processed by the system, and no automated responses are carried out. |
| :activate-case | Makes the named case active. An optional argument can specify a new timeout that specifies how long the case should remain active. |
| :deactivate-case | Makes the named case inactive, so that it will no longer perform any automated responses. |
| :add-template | Allows new additional cases to be added dynamically to the case base. The new case that is added uses values from the current situation to tailor the chosen template. |

What is claimed is:

1. An agent-based distributed reasoning system for managing a computer network with a plurality of hosts, the system stored in a computer readable medium and comprising:

a plurality of interface agents running on the plurality of hosts, the plurality of interface agents assigned to operating resources within the computer network;

a plurality of distributed case-based reasoning agents running on the plurality of hosts, wherein the plurality of distributed case-based reasoning agents is capable of accessing one or more case bases;

a plurality of response agents running on the plurality of hosts, and a plurality of self-monitoring agents providing self healing of agents functions, wherein an interface agent in the plurality interface agents monitors event producing components in the system being managed, captures events, is configured to filter events, and sends an input regarding an event in an assigned resource to a distributed case-based reasoning agent among the plurality of distributed case-based reasoning agents, wherein agents carrying out actions in their local environments include messaging to other agents, site directory service, scheduling actions, or implementing response functions within the monitored network, wherein should an agent fail, the related functions are reassigned to another agent, until the failed agent is repaired or restarted, wherein the distributed case-based reasoning agent, upon receiving the input, accesses the one or more case bases to select a response and communicates the response to a response agent in the plurality of response agents, and wherein the response agent implements the response to resolve the event.

2. The system of claim 1, wherein the resources in the computer network includes network management tools, network security tools, operating system specific features, and health tools.

3. The system of claim 1, wherein the plurality of distributed case-based reasoning agents consider inputs regarding multiple resources sent by one or more of the plurality of interface agents.

4. The system of claim 1, wherein the response includes invoking one or more cases in the one or more case bases.

5. The system of claim 1, wherein the plurality of distributed case-based reasoning agents is capable of selecting a response when multiple cases in the one or more case bases match the input.

6. The system of claim 5, wherein the plurality of distributed case-based reasoning agents uses a precedence order to select a response.

7. The system of claim 6, wherein the precedence order is defined based on specificity and priority values.

8. The system of claim 5, wherein the plurality of distributed case-based reasoning agents uses response function call-switches to select a response.

9. The system of claim 8, wherein the response function call-switches include active, always-fire, call-next, and timeout switches.

10. The system of claim 5, wherein the plurality of distributed case-based reasoning agents uses a precedence order and response function call-switches to select the response.

11. The system of claim 5, wherein the response includes invoking one or more cases in the one or more case bases.

12. The system of claim 1, wherein the plurality of cases includes case templates.

13. The system of claim 12, wherein the case templates are used to represent an event, add a new case, or analyze historical events.

14. The system of claim 1, wherein agents including the plurality of interface agents, the plurality of distributed case-based reasoning agents, and the plurality of response agents are independent.

15. The system of claim 1, wherein cases in the one or more case bases are adaptable.

16. The system of claim 1, wherein a failing agent is replaced by another agent.

17. A method for managing a computer network, the computer network having agent-based architecture with a plurality of agents, some of which are interface agents, distributed case-based reasoning agents, and response agents, the method comprising:
monitoring a resource in the computer network using an interface agent;
reporting, using the interface agent, an event in the resource to a distributed case-based reasoning agent;
selecting a response using the distributed case-based reasoning agent; and
implementing the response using a response agent,
wherein agents carrying out actions in their local environments include messaging to other agents, site directory service, scheduling actions, or implementing response functions within the monitored network,
wherein should an agent fail, the related functions are reassigned to another agent, until the failed agent is repaired or restarted,
wherein the distributed case-based reasoning agent accesses one or more case bases in the selecting step, and
wherein additional cases may be dynamically added automatically by using a case-template.

18. The method of claim 17, further comprising; replacing a failing agent among the plurality of agents with another agent.

19. The method of claim 17, further comprising, dynamically updating the one or more case bases.

20. The method of claim 19, wherein the updating step uses a plurality of case templates.

21. The method of claim 17, further comprising: representing an event using a case template,
wherein the case template may be updated.

22. The method of claim 17, further comprising:
adding a new case to the one or more case bases using a case template.

23. The method of claim 17, further comprising:
analyzing historical data using a case template.

24. The method of claim 23, wherein a result of the analyzing step may be used in the selecting step.

25. The method of claim 17, wherein the selecting step further comprises:
resolving a conflict when multiple cases match the event.

26. The method of claim 25, wherein the resolving step uses a precedence order.

27. The method of claim 26, wherein the precedence order is determined based on specificity and priority values.

28. The method of claim 25, wherein the resolving step uses response function call-switches.

29. The method of claim 28, wherein the response function call-switches include active, always-fire, call-next, and timeout switches.

30. The method of claim 25, wherein the resolving step uses a precedence order and response function call-switches.

31. A system for managing a computer network, the computer network having agent-based architecture with a plurality of agents, some of which are interface agents, distributed case-based reasoning agents, and response agents, the system stored in a computer readable medium and-comprising:
means for monitoring a resource in the computer network using an interface agent;
means for reporting, using the interface agent, an event in the resource to a distributed case-based reasoning agent;
means for selecting a response using the distributed case-based reasoning agent by accessing one or more case bases;
means for self-monitoring and self healing of agents functions.
means for allowing the system to resolve conflicts when more than one case-based reasoning solution applies; and
means for implementing the response using a response agents,
wherein agents carrying out actions in their local environments include messaging to other agents, site directory service, scheduling actions, or implementing response functions within the monitored network,
wherein should an agent fail, the related functions are reassigned to another agent, until the failed agent is repaired or restarted.

32. The system of claim 31, further comprising:
means for surviving a failure without any service interruption.

33. The system of claim 31, further comprising:
means for replacing a failing agent among the plurality of agents with another agent.

34. The system of claim 31, further comprising:
means for dynamically updating the one or more case bases.

35. The system of claim 31, further comprising:
means for resolving a conflict when multiple cases match the event.

36. A computer program product for managing a computer network, the computer network having agent-based architecture with a plurality of agents, some of which are interface agents, distributed case-based reasoning agents, and response agents, the computer program product comprising:
computer readable program code configured to monitor a resource in the computer network using an interface agent;

computer readable program code configured to report, using the interface agent, an event in the resource to a distributed case-based reasoning agent;

computer readable program code configured to select a response using the distributed case-based reasoning agent by accessing one or more case bases;

computer readable program code configured to allow the function of a failing or failed agent to be automatically reassigned to another agent;

computer readable program code configured to self-monitor and self heal agents functions, computer readable program code configured to implement the response using a response agent; and a computer readable medium in which the computer readable program codes are embodied, wherein agents carrying out actions in their local environments include messaging to other agents, site directory service, scheduling actions, or implementing response functions within the monitored network, wherein should an agent fail, the related functions are reassigned to another agent, until the failed agent is repaired or restarted.

* * * * *